UNITED STATES PATENT OFFICE.

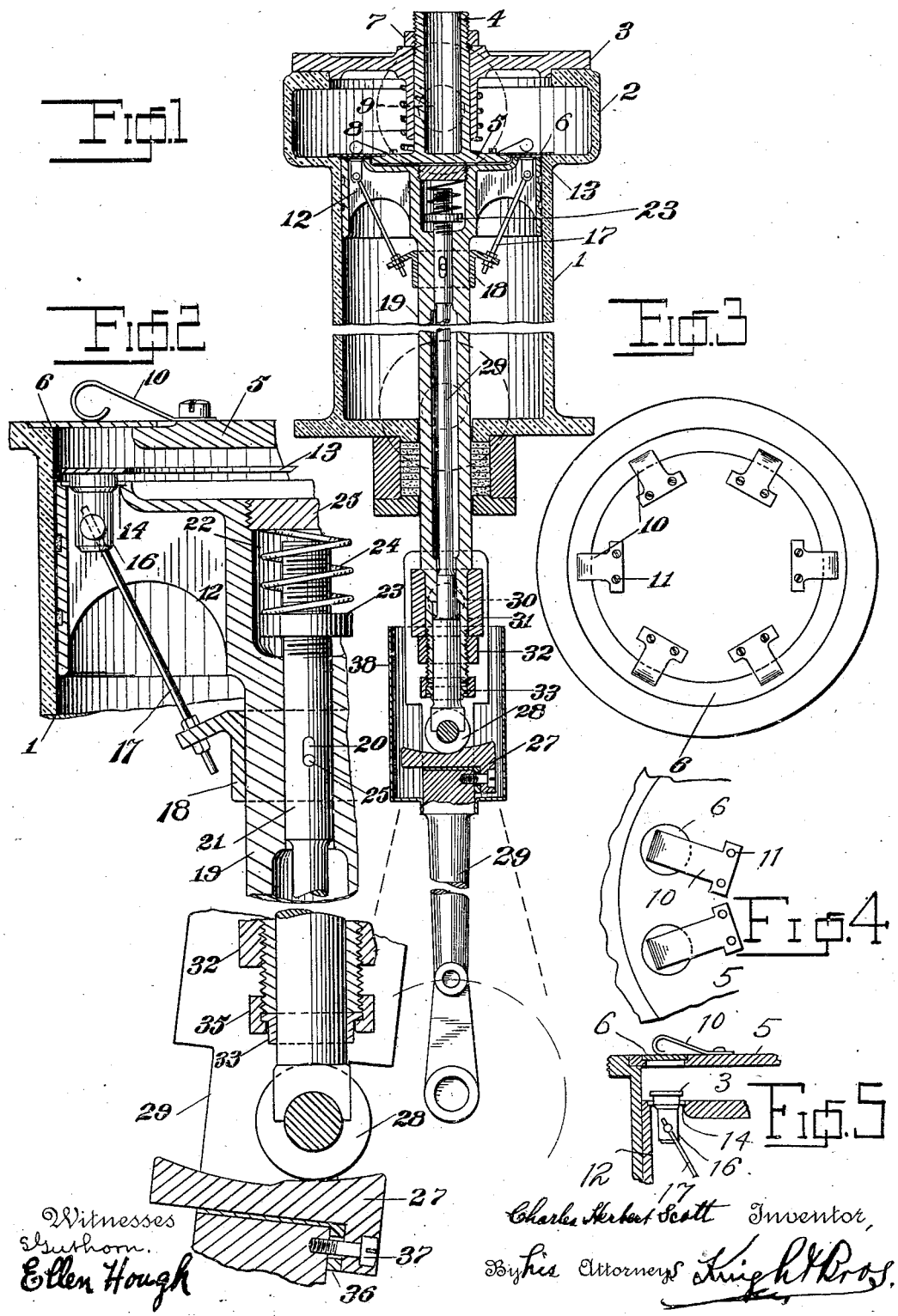

CHARLES HERBERT SCOTT, OF GLOUCESTER, ENGLAND.

PUMP.

954,051. Specification of Letters Patent. Patented Apr. 5, 1910.

Application filed October 18, 1906. Serial No. 339,537.

*To all whom it may concern:*

Be it known that I, CHARLES HERBERT SCOTT, a subject of the King of Great Britain and Ireland, and a resident of Gloucester, England, have invented certain new and useful Improvements in Pumps; and in order that those skilled in the art may understand, make, and use the same I give the following specification.

My invention relates to pumps generally for air, water and other fluids, but is more specifically designed for compressors and vacuum pumps for use in condenser plants.

The object of my invention is to provide a pump suitable for dry or wet work or for compression or vacuum purposes possessing many features of improvement in construction and operation.

In pumps intended for use in condensing plants, it is necessary, in order to secure the greatest efficiency and reliability of operation, to provide a pump in which there is practically no clearance in the cylinder; to provide valves which are positively operated at the proper moments and which are open for the whole suction stroke, and to provide a discharge valve which opens and closes at proper times and which will work at all speeds without chattering.

In the following specification and drawings I have described and shown a pump embodying my invention, and in which the objects of the invention are attained.

Figure 1 is a vertical sectional view; Fig. 2 is a broken view on a larger scale, showing details; and Fig. 3 is a plan view showing the delivery valve. Fig. 4 is a plan view showing a modified form of delivery valve. Fig. 5 is a detail sectional view of the modified form of valves.

Referring to the drawings, 1 indicates the cylinder which is provided with an enlargement 2 forming a delivery chamber. Through the cover 3 of the delivery chamber passes the stem 4 of the cylinder cover. The inner end of the stem 4 is formed with an enlarged portion 5 which forms the cylinder cover, and on the periphery of which and on the edge of the cylinder itself is seated delivery valve 6. The stem of the cover is threaded at its outer end to receive an adjusting nut 7. Surrounding stem 4 is a spring 8 having a bearing at its upper end against the delivery chamber cover 3, and at its lower end against the cylinder cover 5. The spring holds this cover 5 down in such a manner that it may yield slightly if touched by the piston and it is adjusted by the nut 7 so that its periphery and the outer circumference of the cylinder can be put at a level to form accurate seating of the valve 6.

The discharge opening of the pump is indicated in dotted lines at 9. The inlet of the cylinder is indicated in dotted lines at 29.

The delivery valve, indicated at 6, (Fig. 2) is shown as an annular ring of a width sufficient to close the annular discharge port formed between the inner walls of the cylinder and the periphery of the cylinder cover 5. Valve 6 is held in place on the cylinder cover 5 by a series of springs 10 secured at their inner ends by screws 11. Valve 6 is thus resiliently mounted and capable of yielding on return to its seat or to the pressure of compressed fluid in the cylinder.

Piston 12 is provided with the annular valve 13, closing piston 14. This valve is in the form of an annular plate carried upon support 16. Attached to the supports 16 are a series of rods 17 which connect said supports with a slider 18 which slides upon piston rod 19 with a limited movement independent thereof. The piston rod 19 is made hollow and through its bore runs a rod 21. The central portion of the piston 12 is formed with a countersunk recess 22 into which the end of rod 21 projects. The upper end of this rod is screw threaded and is provided with a nut 23. Surrounding the upper end of rod 21 is a spring 24 which has bearing at its upper end upon a nut 25 screwed into and closing the countersunk recess 22. To rod 21 is attached a cross-bar or cotter which connects with the slider 18. The slot 20 is made of sufficient length in the rod 19 to allow for the movement of the internal rod 21 and the slider 18 in relation to the external rod 19. This independent movement of rod 21 is obtained by means of an adjustable cam 27 arranged at its lower end. A cam roller 28 is provided at the lower end of rod 21 and this roller rides on the cam. The cam is adjustably secured in the jaws of pitman rod 29. Pitman rod 29 is connected with the piston rod 19 by means of a wrist pin connection 30, said wrist pin being secured on a reduced portion 31 of the piston rod and held in place by means of a nut 32 screwed on the piston rod. At the lower end of the piston rod is a bearing collar 33 held in place by means of nut 35. Cam 27 is adjusted by means of a liner 36 and screws 37, the adjustment being obtained by the insertion of liners of different thicknesses.

Around the outside of the jaw of the pitman is arranged a wall 38 which forms a well inclosing the lower end of the pitman rod and the cam. When the machine is running this well is kept filled with oil and water used for lubricating the crank chamber, and is filled from the splash from the crank. This not only lubricates the cam but prevents any air being drawn in around the valve rod. In working with a very high vacuum this is a matter of great importance. A little oil and water is drawn through around the valve rod and this simply acts as a lubricant to the inside of the pump cylinder.

Figs. 4 and 5 are detail views showing a modified form of piston and delivery valves which is found more suitable for large size pumps. In this form of the device the delivery and piston valves instead of being annular in form consist of a plurality of circular disks 6 and 13. The disks 6 are mounted in suitable seats in the cylinder cover 5, which is of diameter sufficient to seat on the cylinder walls 1. This cylinder cover is resiliently mounted by means of spring 8 as in the other form of the device so that it can yield if it should be touched by the piston at the end of its stroke. The valves 6 are held in place by means of springs 10 so as to yield to pressure in the cylinder.

The valve openings in the cover 5 are of a size to receive the circular piston valves 13 when the same are lifted at the end of the compression stroke by the cam rod and slider as above described. Piston valves 13 are in the form of circular plates secured to the portion 16, and are operated simultaneously by means of rod 17 connected to the slider.

The operation of the device is as follows: The piston in its upward movement compresses the fluid above it up to the point where the pressure overcomes the pressure of springs 8 and 10 controlling delivery valve. When this point is reached the delivery valve opens and the fluid is forced out of the cylinder into the delivery chamber and out through discharge 9. Any back pressure tends to close the delivery valve. When the piston has reached the limit of its up stroke and at the beginning of its down stroke the pitman passes the center line and commences to assume an angular position. This angular position of the pitman brings the high portion of cam 27 beneath the cam roller 23 at the end of rod 21. Rod 21 is thus given an up-thrust carrying with it slider 18 and rods 17 and opening suction valve 13 in the piston. This takes place at the moment the piston reaches the limit of its compression stroke. Upon the beginning of the down stroke the delivery valve lowers with the piston, and closes without chattering or noise. The suction valve in the piston is held open during the whole of the down stroke. When the piston reaches the limit of its down stroke, the pitman becomes vertical bringing the low portion of the cam under the cam roller, and causing the suction valve to be closed. This valve is thus closed at the beginning of the compression stroke and remains closed throughout the stroke. The inertia of the suction valve at the change of stroke assists its action. The cam may be readily adjusted and timed by means of the construction illustrated and described.

Having thus described the invention what I claim as new and desire to secure by Letters Patent is:

1. In a device of the character described, the combination with a piston, a piston-rod carrying the piston and a pitman connected to the piston rod, of a valve in the piston, a cam carried by the pitman, and a connection between said cam and valve whereby changes in angular position of the pitman operate the valve.

2. In a device of the character described, the combination with a piston, a piston rod carrying the same and a pitman connected to said piston rod, of a valve in the piston, a rod mounted in the piston rod and having movement independent thereof, and a cam mounted on the pitman, said rod having connection with the valve at one end and having engagement with the cam at its other end.

3. In a device of the character described, the combination with a piston, a piston-rod carrying the same, and a pitman connected to the piston rod, of a valve in the piston, a slider on the piston-rod and connected to the valve, a rod mounted in the piston-rod and connected to said slider, and a cam carried by the pitman and operating the said rod.

4. In a device of the character described, the combination of a piston, a valve therein, a tubular piston rod carrying the piston, a rod mounted within the piston rod to have limited movement longitudinally thereof, connections between said rod and the valve, a pitman having bifurcated connection with the piston rod, and a cam adjustably mounted in the bifurcation of said pitman and engaging the said rod.

5. In a device of the character described, the combination of a piston, a valve therein, a hollow piston-rod carrying the piston, a valve-operating rod mounted within the piston-rod, a pitman connected to the piston-rod, a cam for actuating the valve operating rod, said cam carried by the pitman, and a lubricant well inclosing the cam and the ends of the piston and valve-operating rods for the purpose described.

6. In a device of the character described the combination of a cylinder, a delivery chamber at one end thereof, a resiliently mounted cylinder cover separating the cylinder from said chamber, ports in said cover at the periphery of the cylinder, resiliently mounted valves for controlling said ports, a piston in said cylinder having its pressure face conforming to the face of the cylinder cover whereby the piston works without dead space, ports in the periphery of the piston corresponding to the ports in the cylinder cover, valves for controlling said ports, said valves adapted to enter the ports in the cylinder cover and contact with the valves in said cover, positively acting means for operating said piston valves, said means comprising a rod traveling with the piston and capable of movement independently thereof, connections from said rod to each of said piston valves, and a pitman for driving the piston, said pitman provided with means for giving independent movement to said rod.

CHARLES HERBERT SCOTT.

Witnesses:
A. R. ROBERTSON,
J. E. WESTLE.